(12) United States Patent
Colodny et al.

(10) Patent No.: US 10,949,421 B2
(45) Date of Patent: *Mar. 16, 2021

(54) SYSTEM, METHOD, AND APPARATUS FOR LOCATING AND MERGING DATA FIELDS OF LOST RECORDS WITH FOUND RECORDS

(71) Applicant: Chargerback, Inc., Reno, NV (US)

(72) Inventors: Brian Colodny, Reno, NV (US); Michael McLaughlin, Gardnerville, NV (US)

(73) Assignee: Chargerback, Inc., Carson City, NV (US)

( * ) Notice: Subject to any disclaimer, the term of this patent is extended or adjusted under 35 U.S.C. 154(b) by 794 days.

This patent is subject to a terminal disclaimer.

(21) Appl. No.: 15/476,971

(22) Filed: Apr. 1, 2017

(65) Prior Publication Data

US 2017/0206244 A1 Jul. 20, 2017

Related U.S. Application Data

(63) Continuation of application No. 14/158,658, filed on Jan. 17, 2014, now Pat. No. 9,626,645.

(51) Int. Cl.
*G06F 16/245* (2019.01)
*G06F 16/21* (2019.01)
*G06F 16/242* (2019.01)
*G06F 16/25* (2019.01)
*G06F 16/955* (2019.01)
*G06Q 10/08* (2012.01)

(52) U.S. Cl.
CPC .......... *G06F 16/245* (2019.01); *G06F 16/212* (2019.01); *G06F 16/244* (2019.01); *G06F 16/258* (2019.01); *G06F 16/955* (2019.01); *G06Q 10/087* (2013.01)

(58) Field of Classification Search
CPC .... G06F 16/245; G06F 16/955; G06F 16/212; G06F 16/244; G06F 16/258
USPC .......... 707/758, 756, 705, 999.001, 999.005, 707/999.104
See application file for complete search history.

(56) References Cited

U.S. PATENT DOCUMENTS

| 5,955,952 A | 9/1999 | Bergman |
| 6,259,367 B1 * | 7/2001 | Klein .......................... B25J 9/08 340/572.1 |
| 6,449,611 B1 | 9/2002 | Frankel |

(Continued)

OTHER PUBLICATIONS

Office Action for U.S. Appl. No. 13/224,247, dated Jun. 21, 2013.

(Continued)

*Primary Examiner* — Dung K Chau

(57) ABSTRACT

In one embodiment, a system, method, and apparatus to generate a merged record comprises: a client server configured to generate a first report having at least one internal term and at least one descriptive term and a recovery server configured to: receive the first report, associate the at least one internal term with at least one of a plurality of public terms, associate the at least one descriptive term with a generic code or a product code, and associate the at least one descriptive term with at least one main code, the associated main code based upon the associated generic code or product code.

20 Claims, 10 Drawing Sheets

(56) References Cited

U.S. PATENT DOCUMENTS

| | | | |
|---|---|---|---|
| 6,466,983 | B1 | 10/2002 | Strazza |
| 6,604,087 | B1 | 8/2003 | Kolls |
| 6,609,106 | B1 | 8/2003 | Robertson |
| 7,242,279 | B2 | 7/2007 | Wolfe |
| 7,290,288 | B2 | 10/2007 | Gregg |
| 7,318,069 | B2 | 1/2008 | Takahashi et al. |
| 7,379,978 | B2 | 5/2008 | Anderson |
| 7,424,473 | B2 | 9/2008 | Orton, III et al. |
| 7,653,553 | B2 | 1/2010 | Das et al. |
| 7,885,999 | B2 | 2/2011 | St Marie |
| 7,912,842 | B1 | 3/2011 | Bayliss |
| 8,370,062 | B1 | 2/2013 | Starenky |
| 8,370,168 | B1 | 2/2013 | Jenkins et al. |
| 8,577,689 | B1 * | 11/2013 | Czarnetzky ............ G06Q 10/00 705/1.1 |
| 8,973,813 | B2 | 3/2015 | Penny |
| 9,367,527 | B2 | 6/2016 | Colodny et al. |
| 9,408,072 | B2 | 8/2016 | Bombolowsky |
| 9,665,913 | B2 | 5/2017 | Loutit |
| 10,521,802 | B2 | 12/2019 | Colondy et al. |
| 2002/0072924 | A1 * | 6/2002 | Gray ...................... G06Q 10/00 705/1.1 |
| 2002/0178041 | A1 | 11/2002 | Krantz et al. |
| 2003/0036950 | A1 | 2/2003 | Nguyen |
| 2003/0065595 | A1 | 4/2003 | Anglum |
| 2004/0002998 | A1 * | 1/2004 | Takahashi ........... G06F 16/2462 |
| 2004/0035644 | A1 | 2/2004 | Ford |
| 2004/0049396 | A1 | 3/2004 | Hope |
| 2004/0124239 | A1 | 7/2004 | Feld |
| 2004/0153413 | A1 | 8/2004 | Gross |
| 2004/0172335 | A1 | 9/2004 | Batoff |
| 2005/0033615 | A1 | 2/2005 | Nguyen et al. |
| 2005/0171932 | A1 | 8/2005 | Nandhra |
| 2006/0201447 | A1 | 9/2006 | Meadows |
| 2007/0011017 | A1 | 1/2007 | Field |
| 2007/0088569 | A1 | 4/2007 | Berkelhamer et al. |
| 2007/0109126 | A1 | 5/2007 | House |
| 2007/0138272 | A1 | 6/2007 | Saperstein |
| 2007/0138273 | A1 | 6/2007 | Saperstein |
| 2007/0226086 | A1 | 9/2007 | Bauman |
| 2008/0059256 | A1 | 3/2008 | Lynch |
| 2008/0079581 | A1 | 4/2008 | Price |
| 2008/0129488 | A1 | 6/2008 | Hill |
| 2008/0301281 | A1 | 12/2008 | Wang |
| 2009/0013060 | A1 | 1/2009 | St Marie |
| 2009/0187433 | A1 | 7/2009 | Nudd |
| 2009/0230191 | A1 | 9/2009 | Saperstein |
| 2009/0287498 | A2 | 11/2009 | Choi |
| 2009/0319561 | A1 | 12/2009 | Hosp et al. |
| 2010/0035220 | A1 | 2/2010 | Herz et al. |
| 2010/0223245 | A1 | 9/2010 | Vermilye |
| 2010/0332356 | A1 | 12/2010 | Spolar |
| 2011/0061018 | A1 | 3/2011 | Piratla et al. |
| 2011/0234399 | A1 | 9/2011 | Yan |
| 2012/0059661 | A1 | 3/2012 | Colodny |
| 2012/0059693 | A1 * | 3/2012 | Colodny .............. G06Q 10/083 705/14.1 |
| 2012/0066008 | A1 | 3/2012 | Scudder |
| 2012/0084165 | A1 | 4/2012 | Shigeki |
| 2012/0267430 | A1 | 10/2012 | Penny |
| 2013/0212042 | A1 * | 8/2013 | Rosenberg ............ G06Q 40/06 705/36 R |
| 2014/0095274 | A1 | 4/2014 | McLaughlin |
| 2014/0281857 | A1 | 9/2014 | Colodny |
| 2014/0327518 | A1 | 11/2014 | Loutt |
| 2016/0275442 | A1 | 9/2016 | Colodny |
| 2016/0300238 | A1 | 10/2016 | Colodny |
| 2017/0206244 | A1 | 7/2017 | Colondy et al. |
| 2017/0221162 | A1 | 8/2017 | Colondy et al. |

OTHER PUBLICATIONS

Office Action for U.S. Appl. No. 13/224,244, dated Jun. 27, 2013.
U.S. Appl. No. 13/631,456, filed Sep. 28, 2012.
U.S. Appl. No. 13/842,768, filed Mar. 15, 2013.
Final Office Action for U.S. Appl. No. 13/224,247, dated Oct. 7, 2013.
Amazon "Checkout by Amazon", https://payments.amazon.com/sdui/sdui/business/cba#features, Apr. 1, 2010.
Stamps "USPS Shipping at Your Fingertips", http://www.stamps.com/welcom/, Aug. 26, 2010.
Final Office Action for U.S. Appl. No. 13/224,244, dated Jan. 8, 2014.
Final Office Action for U.S. Appl. No. 13/224,247, dated Jun. 17, 2014.
Office Action for U.S. Appl. No. 13/631,456, dated Jun. 17, 2014.
Office Action for U.S. Appl. No. 13/631,456, dated Oct. 6, 2014.
Office Action for U.S. Appl. No. 13/224,247, dated Oct. 7, 2014.
Office Action for U.S. Appl. No. 13/631,456, dated Feb. 11, 2015.
Office Action for U.S. Appl. No. 13/842,768, dated Jul. 29, 2015.
Final OA for U.S. Appl. No. 13/224,247 mailed Sep. 1, 2011.
Office Action for U.S. Appl. No. 13/631,456 dated Dec. 7, 2015.
Final Office Action for U.S. Appl. No. 13/842,768, dated Dec. 9, 2015.
Notice of Allowance for U.S. Appl. No. 13/842,768, dated Mar. 16, 2016.
Office Action for U.S. Appl. No. 14/158,658 dated Apr. 6, 2016.
Office Action for U.S. Appl. No. 13/224,247 dated Apr. 21, 2016.
Office Action for U.S. Appl. No. 13/631,456 dated May 6, 2016.
FulcrumTech, How to Create an Effective Call-to-Action; 10 Tips to Help Drive Conversions to your Email Campaign, www.fulcrumtech.net/resources/how-to-create-an-effective-call-to-action/, Jun. 2010.
Final Office Action for U.S. Appl. No. 14/497,095, dated Sep. 25, 2016.
Merriam Webster Dictionary "Coupon", http://merriam-webster.com/dictionary/coupon, Sep. 4, 2006.
Final Office Action for U.S. Appl. No. 13/224,247, dated Sep. 23, 2016.
Notice of Allowance for U.S. Appl. No. 14/158,658, dated Oct. 20, 2016.
Office Action for U.S. Appl. No. 13/224,244, dated Dec. 14, 2016.
Office Action for U.S. Appl. No. 16/254,530, dated Sep. 18, 2019.
Notice of Allowance for U.S. Appl. No. 15/170,098, dated Sep. 25, 2019.
S.E. Robertson Simple, proven approaches to text retrival, 1994, University Cambridge Computer Laboratory.
Gerard Salton, Term Weighting Approaches in Automatic Text Retrieval, Cornell Uniersity Department of Computer Science.
Weiwei Cui, TextFlow, Towards better understanding of evolving topics in text, 2011, IEEE Transactions on Visualization and Computer graphics.
Notice of Allowance for U.S. Appl. No. 15/488,377, dated Oct. 9, 2019.
Office Action for U.S. Appl. No. 15/476,971, dated Dec. 12, 2019.
Final Office Action for U.S. Appl. No. 16/254,530, dated Jan. 8, 2020.
Office Action for U.S. Appl. No. 16/687,621, dated Mar. 6, 2020.
Office Action for U.S. Appl. No. 13/224,247, dated May 9, 2017.
Final Office Action for U.S. Appl. No. 13/224,244, dated May 24, 2017.
Office Action for U.S. Appl. No. 15/181,187, dated Jun. 16, 2017.
Office Action for U.S. Appl. No. 15/170,098, dated Jun. 30, 2017.
Office Action for U.S. Appl. No. 13/631,456, dated Aug. 11, 2017.
Office Action for U.S. Appl. No. 14/497,095, dated Aug. 25, 2017.
Office Action for U.S. Appl. No. 13/224,244, dated Aug. 31, 2017.
Final Office Action for U.S. Appl. No. 13/224,247, dated Sep. 28, 2017.
Final Office Action for U.S. Appl. No. 13/224,244, dated Jan. 16, 2018.
Final Office Action for U.S. Appl. No. 15/170,098, dated Feb. 7, 2018.
Final Office Action for U.S. Appl. No. 15/181,187, dated Mar. 5, 2018.
Final Office Action for U.S. Appl. No. 13/631,456 dated Mar. 8, 2018.
Office Action for U.S. Appl. No. 15/181,187, dated Nov. 21, 2018.

(56) References Cited

OTHER PUBLICATIONS

Final Office Action for U.S. Appl. No. 15/170,098, dated Dec. 31, 2018.
MS Shift, "Command and Control Your Hotel: Lost & Found—Admin User's Guide," www.msshift.com, © 2009.
MS Shift, "Command and Control Your Hotel: Lost & Found—User's Guide," www.msshift.com, © 2008.
"Command and Control your Hotel with MS Shift Hotel Security Systems" brochure, www.msshift.com, © 2008.
Notice of Intent to Issue Ex Parte Reexamination Certificate, U.S. Appl. No. 90/014,004, mailed Aug. 14, 2018.
Office Action in Ex Parte Reexamination Certificate, U.S. Appl. No. 90/014,004, dated May 1, 2018.
Decision on Petition under 37 CFR 1.515 and 1.81, U.S. Appl. No. 90/014,004, mailed Jan. 17, 2018.
Order Denying Request for Ex Parte Examination, U.S. Appl. No. 90/014,004, mailed Aug. 14, 2018.
Request for Ex Parte Examination, 90/014,004, mailed Aug. 25, 2017.
Order Denying Request for Ex Parte Examination, 90/014,004, mailed Oct. 18, 2017.
Final Office Action for U.S. Appl. No. 15/181,187, dated Apr. 3, 2019.
Office Action for U.S. Appl. No. 15/382,267, dated Apr. 4, 2019.
Office Action for U.S. Appl. No. 16/254,530, dated May 1, 2020.
Notice of Allowance for U.S. Appl. No. 16/687,621, dated May 14, 2020.
Office Action for U.S. Appl. No. 16/690,068, dated Jul. 23, 2020.
Final Office Action for U.S. Appl. No. 15/476,971, dated Jul. 24, 2020.
U.S. Appl. No. 16/254,530 NPL—EIC 3600 Search Report (Year: 2020).
Final Office Action for U.S. Appl. No. 16/254,530, dated Oct. 5, 2020.
MS Shift, Inc. Command and Control Your Hotel—Lost and Found, User Guide 2008. p. 1-27.†

\* cited by examiner
† cited by third party

FIG. 6A

SYSTEM, METHOD, AND APPARATUS FOR LOCATING AND MERGING DATA FIELDS OF LOST RECORDS WITH FOUND RECORDS

CROSS-REFERENCE TO RELATED APPLICATION

This application is a continuation of U.S. application Ser. No. 14/158,658, filed Jan. 17, 2014 and entitled "SYSTEM, METHOD, AND APPARATUS FOR LOCATING AND MERGING DOCUMENTS," which is hereby incorporated herein by reference.

FIELD OF THE INVENTION

The present disclosure relates generally to merging data fields. More particularly, the present disclosure relates to locating and merging data fields in lost and found records.

BACKGROUND OF THE INVENTION

Everyone has forgotten a personal item at least once. Once lost, the items may or may not ever be returned to the rightful owner. For example, when on vacation, a user may forget an item(s) in a hotel room. In another example, a customer may forget an item in a rental car, sporting event, or any other establishment or event. The most common item left in hotel rooms is chargers, such as a cell phone charger. However, any other valuable items may also be lost or left behind such as clothing, cell phones, jewelry, and the like.

When reporting the lost item, the user or customer or the establishment may submit a lost report. Then when the item is found, the establishment and/or the finder may submit a found report. However, to determine whether the lost report matches the found report requires a person to manually compare the information between the two records to determine if the found item matches the lost item.

OVERVIEW

The invention is directed to a system, method, and apparatus for locating and merging data fields based on matching higharchical keywords and/or codes in lost and found records, reports, or documents. Each lost and/or found record or report may have a plurality of data fields such as customer identification, description information, and any other desired data. Initially, keywords stored in the data fields are matched with generic terms and if no match is found, another match is conducted with product terms. If there is a match found with generic terms, a generic code associated with the generic term is assigned to the record or document. If there is a match found with a product term, a product code associated with the product term is assigned to the record or document. The record or report is then assigned a main code based upon the generic code and/or product code.

To locate and determine potential data fields to merge to produce a single merged record or document, the customer identification and main code of one record is matched with other customer identification and main codes other records stored in a report server. In one embodiment, additional data fields may be compared such as the generic code and/or product codes. When two or more records or documents are selected to be merged, a comparison is made to determine whether there are any terms that are different in each of the data fields. If there are terms in the data fields that are different, a single record with both terms may be generated. The different terms may be set apart or presented in a different format such as in italics, bolded in a different color, on separate lines, or in any other format.

In one embodiment, a system to generate a merged record comprises a client server configured to generate a first report having at least one internal term and at least one descriptive term and a recovery server configured to: receive the first report; associate the at least one internal term with at least one of a plurality of public terms; associate the at least one descriptive term with a generic code or a product code; and associate the at least one descriptive term with at least one main code, the associated main code based upon the associated generic code or product code.

In another embodiment, a method for generating a merged record, includes receiving, at a server, a first report, the first report including first report information, the first report information including at least one descriptive term and at least one internal term; associating the at least one internal term with at least one of a plurality of public terms; associating the at least one descriptive term with a generic code or a product code; and associating the at least one descriptive term with at least one main code, the associated main code based upon the associated generic code or product code.

In yet another embodiment, a method for generating a merged lost report, comprises receiving, at a server, a lost report, the lost report including lost report information, the lost report information including at least one descriptive term and an internal term; associating the at least one internal term with at least one of a plurality of public terms; associating the at least one descriptive term with a generic code or a product code; associating the at least one descriptive term with at least one main code, the associated main code based upon the associated generic code or product code; locating a found report having found report information, the found report information including at least a public term and at least one main code; and determining whether the found report public term and main code matches the first report public term and main code.

In one embodiment, a program storage device readable by a machine tangibly embodying a program of instructions executable by the machine to perform a method for generating a merged record, the method comprises receiving, at a server, a first report, the first report including first report information, the first report information including at least one descriptive term and at least one internal term; associating the at least one internal term with at least one of a plurality of public terms; associating the at least one descriptive term with a generic code or a product code; and associating the at least one descriptive term with at least one main code, the associated main code based upon the associated generic code or product code.

The present invention provides other hardware configured to perform the methods of the invention, as well as software stored in a machine-readable medium (e.g., a tangible storage medium) to control devices to perform these methods. These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings:

FIGS. 6A and 6B are exemplary screen shots illustrating customization of match terms.

DESCRIPTION OF EXAMPLE EMBODIMENTS

Figure 1:
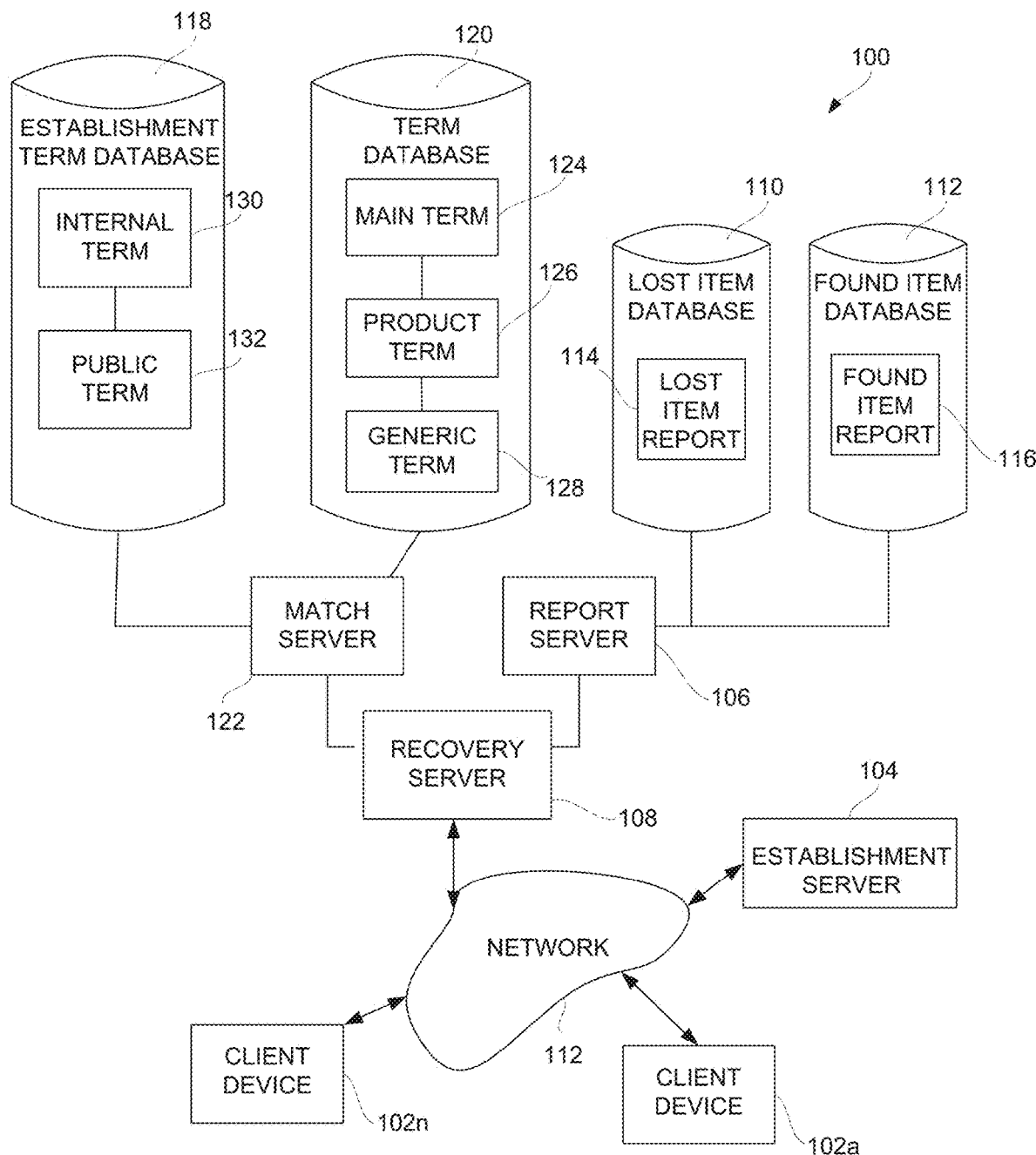
FIG. 1 illustrates an exemplary system for merging records.

Embodiments are described herein in the context of a system, method, and apparatus for locating and merging data fields of lost records with found records. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The disclosed invention is directed to a system, method, and apparatus for locating and merging data fields based on matching higharchical keywords and/or codes in lost and found records or documents. Each lost and/or found record or report may have a plurality of data fields such as customer identification, description information, and any other desired data. Initially, keywords stored in the data fields are matched with generic terms and if no match is found, another match is conducted with product terms. If there is a match found with generic terms, a generic code associated with the generic term is assigned to the record or document. If there is a match found with a product term, a product code associated with the product term is assigned to the record, report, or document. The record or report is then assigned a main code based upon the generic code and/or product code.

To locate and determine potential data fields to merge to produce a single merged record or document, the customer identification and main code of one record is matched with all other CID and MC's other records documents stored in a report server. In one embodiment, additional data fields may be compared such as the generic code and/or product codes. When two or more records or documents are selected to be merged, a comparison is made to determine whether there are any terms that are different in each of the data fields. If there are terms in the data fields that are different, a single record with both terms may be generated. The different terms may be set apart or presented in a different format such as in italics, bolded in a different color on separate lines, or in any other format.

Several embodiments of the invention are discussed below with reference to FIGS. 1-6. However, those skilled in the art will readily appreciate that the detailed description given herein with respect to these figures is for explanatory purposes as the invention can extend beyond these limited embodiments.

Referring now to FIG. 1, an exemplary system for locating and merging records or reports. The system 100 can have a plurality of client computing devices 102a, 102n (where n is an integer) configured to communicate with a recovery server 108 via network 112 to transmit a lost item report with the hope of recovering their lost items. Client computing devices 102a-n and recovery server 108 may be connected to network 112 via any known wired or wireless manner. Client computing devices 102a-n may be any computing device such as a desktop computer, laptop, netbook, as well as any mobile computing device such as mobile (e.g., cellular) phones, media players, personal digital assistants (PDAs), and the like.

The system 100 may have an establishment server 104 configured to communicate with the recovery server 108 via network 112 to transmit lost and/or found item reports and conduct any other transactions such as receive shipping documents, authentication of the customer, and the like. The establishment server 104 may be associated with any type of business such as a hotel, supermarket, airport, airline company, coffee shop, car rental company, school (e.g. primary school, university, college, and the like), cruise ship, movie theaters, parks and campgrounds, shopping centers, business centers, private residences, or any other location where a lost item may be lost and/or found. Furthermore, the establishment server may also be an event, such as a football game, convention, seminar, and the like.

Recovery server 108 may have a report server 106. The report server 106 may have a lost item database 110 and a found item database 112. The lost item database 110 may be configured to store lost item reports 114 submitted by the client device 102a-n or the establishment server 104. The found item database 112 may be configured to store found item reports 116 transmitted from the client device 102a-n or the establishment server 104. The lost item report 114 may have a plurality of data fields storing information such as customer identification, description information, associated codes, and any other desired data. For example, the customer identification fields may include customer name, user name, password, electronic mail address, address, phone number, and any other desired customer information. In another example, the description information may include lost item description such as the location of where the item was found, detailed description of the item, such as color, shape, manufacturer, client contact information, current storage location of the lost item and other descriptive information. The location of where the item was found may include a business name, room number, seat number, and/or additional location data of where the item was located. The lost item description may also include an image of the lost item to enhance or increase the chances for identification of the lost item. In yet another example, the code data field may include any codes that are associated with the lost item report 114. As further discussed in detail below, the associated codes may be used to locate potential documents to merge.

The recovery server 108 may have a match server 122. The match server 122 may be configured to store keyword terms. The match server 122 may have a term database 120 configured to store various terms such as, for example, main terms 112, product terms 112 and generic terms 128. Those of ordinary skill in the art will now realize that the terms may be organized in any desired data structure or organization scheme that is understandable or necessary for the organization. One example embodiment will now be described. The main terms 128 may be main or high-level keyword terms to describe various products. The main terms may be a description used to describe a plurality of products. For example, and as illustrated in Table 1, main terms may include "clothing", "electronics", "sporting goods", and the like. Each main term 128 may be assigned a code or unique identifier. For example, "clothing" may be assigned code 10. Although illustrated in numerical format, the code may be any unique code or identifier consisting of text, symbols, or numbers.

TABLE 1

MAIN TERMS

|  | CODE |
|---|---|
| CLOTHING | 10 |
| ELECTRONICS | 30 |
| CHILDREN TOYS | 50 |
| FURNITURE | 70 |
| SPORTING GOODS | 20 |
| BOOKS | 40 |
| ADULT TOYS | 60 |
| HEALTH BEAUTY | 80 |

Each main term 124 may be associated with a plurality of product terms 126 as illustrated in Table 2. The product terms 126 may further define what the main terms 124 are. For example, under main term "clothing", the product terms 126 may include pants, shirts, dress, shoes, and the like. In another example, main term "health beauty" may include the product terms perfume, make-up, razor, soap, lipstick, and the like. Each product term 126 may be assigned a code or unique identifier. For example, "pants" may be assigned code 10-1, "shirt" may be assigned code 10-2, and the like. Although illustrated in numerical format, the code may be any unique code or identifier consisting of text, symbols, or numbers.

TABLE 2

| MAIN TERM: MAIN CODE | PRODUCT TERM | PRODUCT CODE |
|---|---|---|
| CLOTHING: 10 | PANTS | 10-1 |
|  | SHIRT | 10-2 |
|  | DRESS | 10-3 |
|  | SHOES | 10-4 |
|  | SOCKS | 10-5 |
|  | JACKET | 10-6 |

TABLE 2-continued

| MAIN TERM: MAIN CODE | PRODUCT TERM | PRODUCT CODE |
|---|---|---|
|  | HAT | 10-7 |
|  | GLOVES | 10-8 |
| HEALTH BEAUTY: 80 | PERFUME | 80-1 |
|  | MAKE-UP | 80-2 |
|  | RAZOR | 80-3 |
|  | SOAP | 80-4 |
|  | LIPSTICK | 80-5 |
|  | NAIL POLISH | 80-6 |

Each product term 126 may be associated with a plurality of generic terms 128 as illustrated in Table 3. The generic terms 128 may further define what the product terms 126 are. For example, under product term "SHOES", the generic terms 128 may include sneakers, dress, high hell, crocks, and the like. In another example, product term "health beauty" may include the generic terms concealer, foundation, mineral, powder, and the like. As such, there may be substantially more generic terms than product terms, and substantially more product terms than main terms.

Each generic term 128 may be assigned a code or unique identifier. For example, "sneakers" may be assigned code 10-4-1, "dress" may be assigned code 10-4-2, and the like. Although illustrated in numerical format, the code may be any unique code or identifier consisting of text, symbols, or numbers.

TABLE 3

| MAIN TERM: MAIN CODE | PRODUCT TERM: PRODUCT CODE | GENERIC TERM: GENERIC CODE |
|---|---|---|
| CLOTHING: 10 | SHOES: 10-4 | SNEAKER: 10-4-1 |
|  |  | DRESS: 10-4-2 |
|  |  | SANDEL: 10-4-3 |
|  |  | CROCS: 10-4-4 |
|  |  | BOOT: 10-4-5 |
|  |  | SKETCHERS: 10-4-6 |
|  |  | VANS: 10-4-7 |
|  |  | STEVE MADDEN: 10-4-8 |
| HEALTH BEAUTY: 80 | MAKE-UP: 80-2 | CONCEALER: 80-2-1 |
|  |  | FOUNDATION: 80-2-2 |
|  |  | MINERAL: 80-2-3 |
|  |  | POWER: 80-2-4 |
|  |  | CREAM: 80-2-5 |
|  |  | BRONZER: 80-2-6 |
|  |  | BLUSH: 80-2-7 |
|  |  | EYEBROW PENCIL: 80-2-8 |

In one embodiment, each of the product terms 126 and generic terms 128 may also include misspelled keywords, keywords with interchanged letters, alternative spellings, and the like. For example, generic terms 128 may include the following misspelled terms for "CROCS": "croks"; "crooks"; "krocks"; "kroks"; and any other alternative or misspelled terms. In another example, product term 126 may include the following misspelled terms for "SNEAKERS": "sneeker"; "sneker"; "sneckr"; "sneaker"; "sneaker"; and any other alternative or misspelled terms.

EXAMPLES

For exemplary purposes only and not intended to be limiting, example term databases 120 will be described. Although described with reference to different establishments, this is not intended to be limiting as the terms and/or keywords in the term database 120 may vary and may be based upon the type of establishment or desired terms of the established.

Example 1

The main terms 124 for an airport establishment may be each country the airline services. The product terms 126 may then further define each of the main terms 124. The product terms 126 may be cities or states within the country that the airline services. The generic terms 128 may include cities within each state and well as any misspellings or alternative spellings of the state, country, or city. This is further illustrated and explained in Table 4.

TABLE 4

| MAIN TERM | PRODUCT TERM | GENERIC TERM |
|---|---|---|
| UNITED STATES | CALIFORNIA | SACRAMENTO |
| | CALI | SAN DIEGO |
| | SOUTHERN CALIFORNIA | LOS ANGELES |
| | NORTHERN CALIFORNIA | FRESNO |
| | KALIFORNIA | SAN JOSE |
| | KALIPHONIA | SAN FRANCICO |
| | | LAX |
| | | SJC |
| | | SFO |

Example 2

Recovery server 108 may allow the establishment to further customize its own match terms stored in an establishment term database 118. If the establishment is a hotel, the hotel's main terms may be internal terms 130 associated with a location within the hotel. For example, the internal term 130 "ZONE-1-LOBBY" may be associated with the reception area of the lobby, internal term 130 "ZONE-2-LOBBY" may be associated with the waiting are of the lobby, and internal term 130 "POOL-NW" may be associated with the Jacuzzi area of the pool.

Each internal term 130 may have a plurality of generic public terms 132 associated with each of the internal terms 130. For example, "ZONE-1-LOBBY" may be associated with generic public terms 132 "reception", "concierge", "front desk", "check-in", "receptionist", and the like. In another example, "POOL-NW" may be associated with generic public terms 132 "Jacuzzi", "hot tub", "spa", "hot-tub", and the like.

In another embodiment, recovery server 108 may allow the establishment to add, edit, or delete any existing or pre-defined match terms (e.g. the main terms, product terms, or generic terms) to further customize the match terms to the establishment's desires. For example, the establishment may want to change or customize the pre-defined match term "CLOTHING" to "WOMEN CLOTHING" and "MEN CLOTHING". In other words, the establishment may customize any existing hierarchy of match terms stored in the match server databases as further illustrated in Table 5.

TABLE 5

| INTERNAL TERM | GENERIC TERM |
|---|---|
| ZONE-1 -LOBBY | RECEPTION |
| | CONCIERGE |
| | FRONT DESK |
| | CHECK-IN |
| | RECEPTIONIST |
| POOL-NW | JACUZZI |
| | HOT TUB |
| | SPA |
| | HOT-TUB |

Example 3

Figure 2:
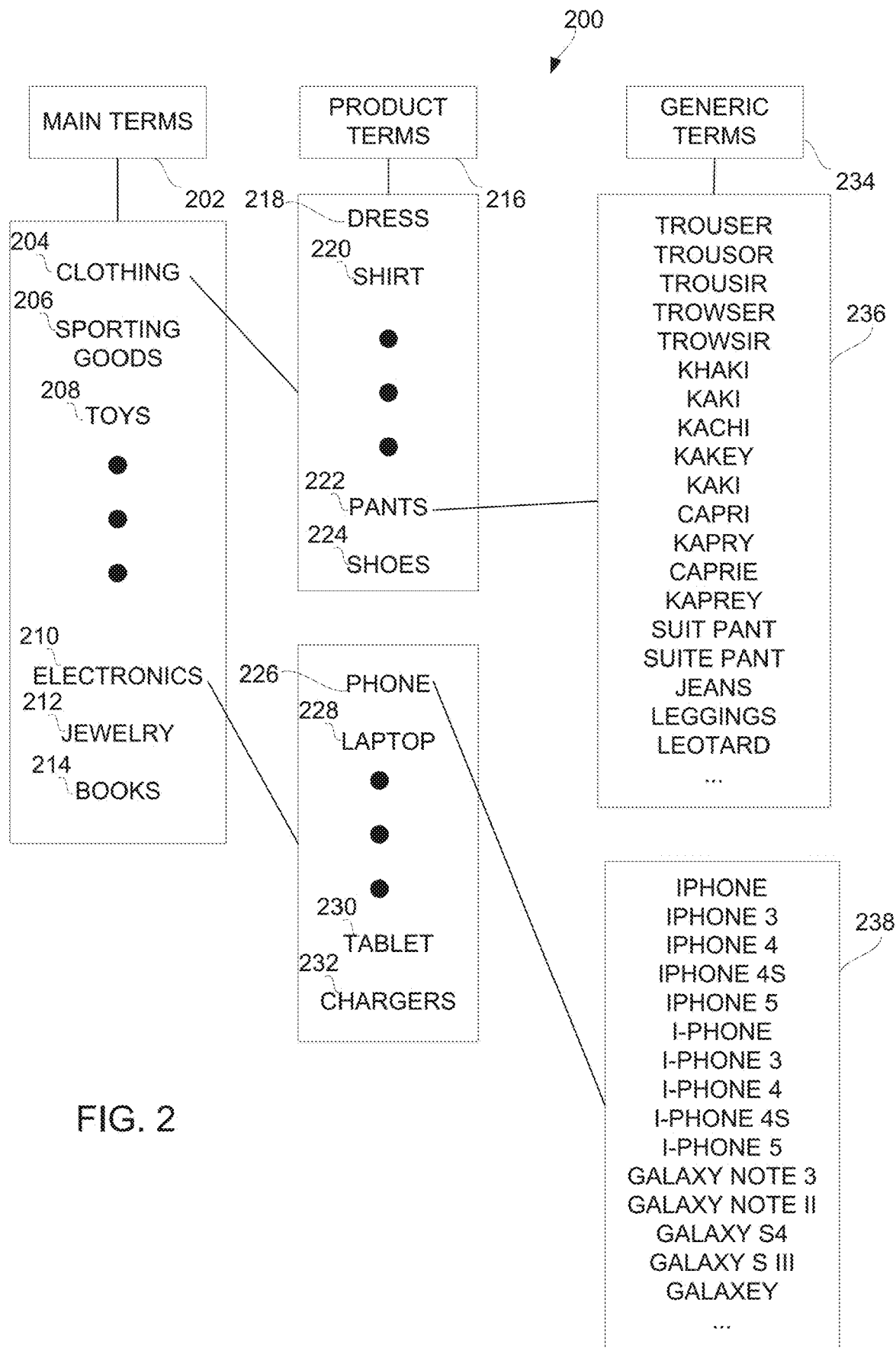
FIG. 2 illustrates an exemplary term database.

FIG. 2 illustrates another exemplary term database. The establishment may be any establishment such as a hotel, airplane, seminar, theme park, movie theatre, and the like. The term database 200 may have main terms 202, product terms 216, and generic terms 234. Main terms 202 may have keywords "CLOTHING" 204, "SPORTING GOODS" 206, "TOYS" 208, "ELECTRONICS" 210, "JEWELRY" 212, "BOOKS" 214, and the like.

Main term 202 may be associated with a plurality of product terms 216 that further define each main term 202. "CLOTHING" 204 may be associated with product terms 216 "DRESS" 218, "SHIRT" 220, "PANTS" 222, and "SHOES" 224. Main term 202 "ELECTRONICS" 210 may be associated with product terms 216 "PHONE" 226, "LAPTOP" 228, "TABLET" 230, and "CHARGERS" 232.

Product terms 216 may be associated with a plurality of generic terms 234 which further define each of the product terms 216. Product term 216 "PANTS" 222 may be associated with generic terms 236 "TROUSER", "KHAKI", "CAPRI", "JEANS", and the like. The generic terms 236 may also include alternative or misspelled keywords such as "TROUSOR", "KAKI", "KAPRY", and the like. Product term 216 "PHONE" 226 may be associated with generic terms 238 "IPHONE™", "IPHONE™3", "GALAXY NOTE™ 3", "GALAXY NOTE™ II" AND THE LIKE. The generic terms 236 may also include various misspelling and/or spellings of each of the generic terms 238 such as "I-PHONE™", "I-PHONE™ 3", "I-PHONE™ 4" and the like.

Referring back to FIG. 1, in one embodiment, a customer may call the establishment to report a lost or found item. The establishment server 104 may then create and transmit to the recovery server 108 a lost item report 114 or a found item report 116. In another embodiment, client device 102*a-n* may self-report and transmit to recovery server 108 a lost item report 114 and/or a found item report 116. The lost item report 114 may be stored in the lost item database 110 and the found item report 116 may be stored in the found item database 112.

Figure 3A:
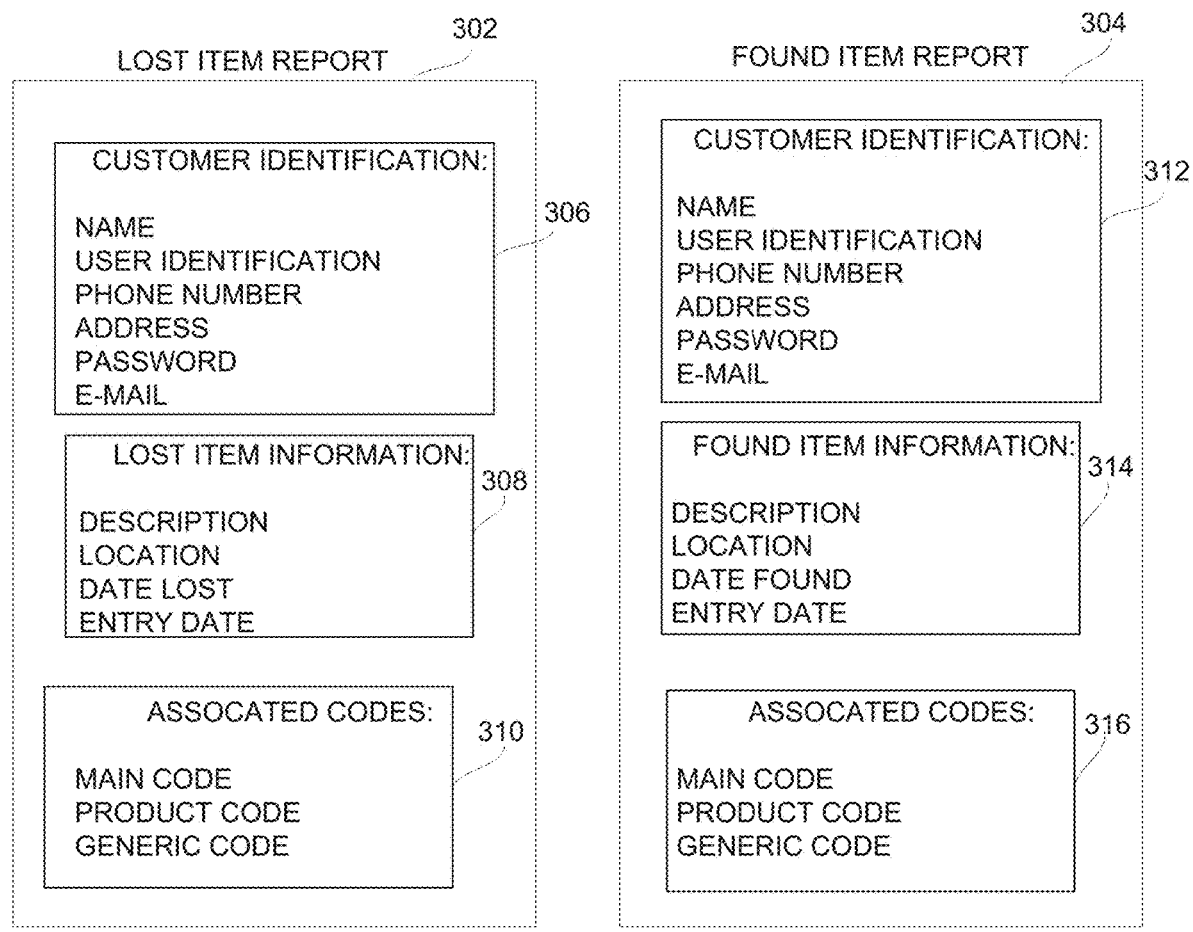
FIGS. 3A and 3B illustrate the matching and merging of data fields according to one embodiment.
Figure 3B:
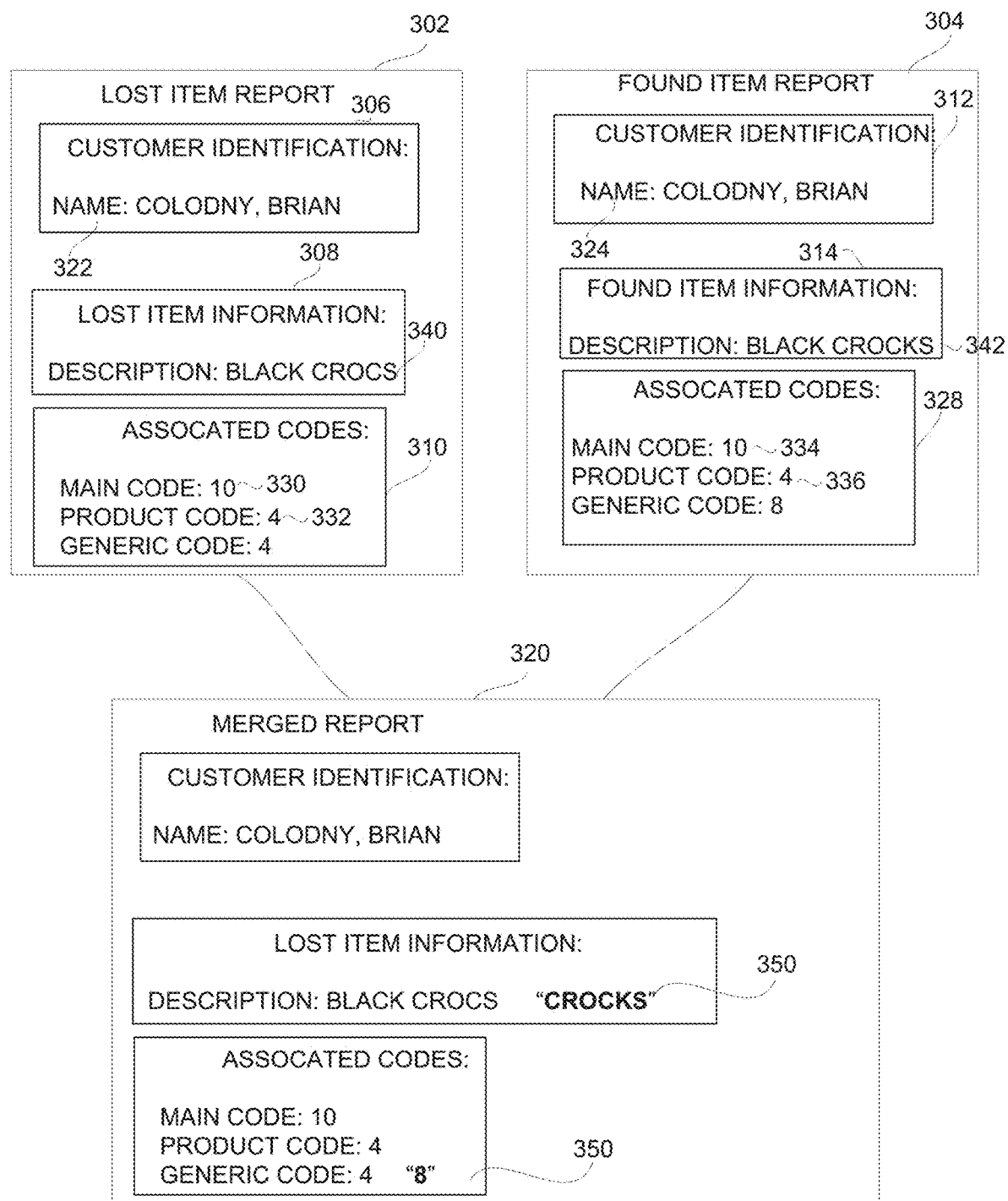

FIGS. 3A and 3B illustrate the matching and merging of data fields according to one embodiment. Referring to FIG. 3A, the lost item report 302 may have a plurality of data fields such as a customer identification data field 306, lost item information data field 308, and an associated code data field 310. Customer identification 306 may include information such as name, unique or user identification, phone number, address, password, electronic mail, or any other desired customer information. Lost item information 308 may also include descriptive information of the lost item, location of where the item was lost, date the item was lost (e.g. a business name, room number, seat number, level, and/or additional location data of where the item was found), entry date of the lost item report 302, and any other desired lost item information. Associated codes 310 may be any codes associated with the lost item report 302 based upon keywords or terms obtained from the lost item information 308.

The found item report 304 may also have a plurality of data fields similar to the lost item report 302. The found item report 304 may have a plurality of data fields such as a customer identification data field 312, found item information data field 314, and an associated code data field 316. Customer identification 312 may include information such as name, unique or user identification, phone number, address, password, electronic mail, or any other desired customer information. Found item information 314 may also include descriptive information of the found item, location of where the item was found (e.g. a business name, room number, seat number, level, and/or additional location data of where the item was found), date the item was found, entry date of the found item report 304, and any other desired lost item information. Associated codes 316 may be any codes associated with the found item report 304 based upon keywords or terms obtained from the found item information 314.

Referring now to FIG. 3B, data fields in the lost item report 302 and the found item report 304 may be compared to locate potential records, reports or documents to be merged. In one embodiment, the customer identification 306, 312 of the lost item report 302 and the found item report 304 may be compared. In another embodiment, the associated codes 310, 316 of the lost item report 302 and the found item report 304 may be compared. It will now be known that any of the data fields may be compared to locate potential documents to be merged.

As illustrated, the customer name data field may be "COLODNY, BRIAN" 322, 324 in both the lost item report 302 and the found item report 304. Additionally, the main code data field "10" 330, 334 and the product code data field "4" 332, 336 in both the lost item report 302 and the found item report 304 may be the same. If there is a match in the customer identification data fields and/or the associated code data fields, the records may be potential reports to merge.

If it is determined that the records are to be merged, the item information data field 308, 314 from both the lost item report 302 and the found item report 304 may be compared for any differences or discrepancies. As illustrated in FIG. 3B, the description data field in the lost item report 302 may be "BLACK CROKS" 340. However, the description data field in the found item report 304 may be "BLACK CROCKS" 342. Since the spellings are different, the discrepancy will be noted and included in the merged report 320.

A single combined merged report 320 may be generated by combining the data fields from each record. Although illustrated as merging two reports, this is not meant to be limiting as more than one record may be merged. For example, there may be two or more found item reports that may be merged with a single lost item report. In another embodiment, two or more lost item reports may be merged with a single found item report. Furthermore, although illustrated as merging a lost item report with a found item report, this is not intended to be limiting as two or more lost item reports may be merged. In another embodiment, two or more found item reports may be merged. In still another embodiment, the found item report may be merged with the lost item report.

The resulting merged report 320 may include information both from the lost item report 302 and the found item report 304. As illustrated, data fields from the found item report 304 information may be merged with data fields from the lost item report 302. Generally, lost item reports have more information and the information is more accurate than found item reports as customers want their lost items returned. Thus, information in the found item reports 304 may be merged or added to the lost item report 302. However, this is not intended to be limiting as the lost item report 302 information may be merged or added to found item reports 304.

The merged or added information may be presented differently or separate from the information in the lost item report. In one embodiment, the merged information may be presented as italics, bolded, in a different font, in a different text size, or presented in any other known different manner. In another embodiment, the merged information may be set apart from the information in the lost item report. For example, the added information may be presented and set apart in brackets, quotation marks, on a different line, or set apart in any other known manner. As illustrated, the merged information 350 is set forth in quotation marks, displayed in all capital letters, and bolded.

Figure 4A:
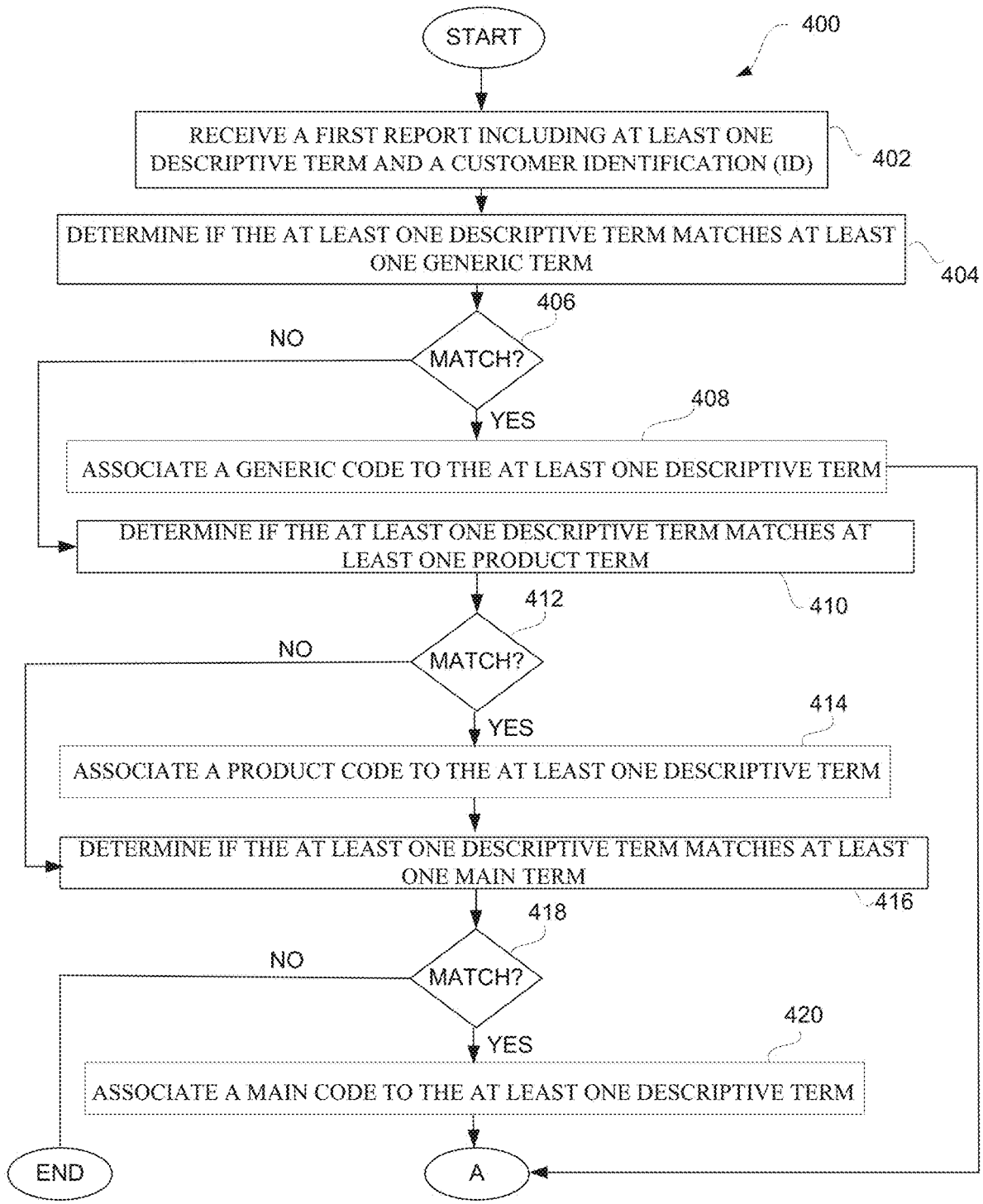
FIGS. 4A and 4B illustrate an exemplary method for locating and merging records.
Figure 4B:
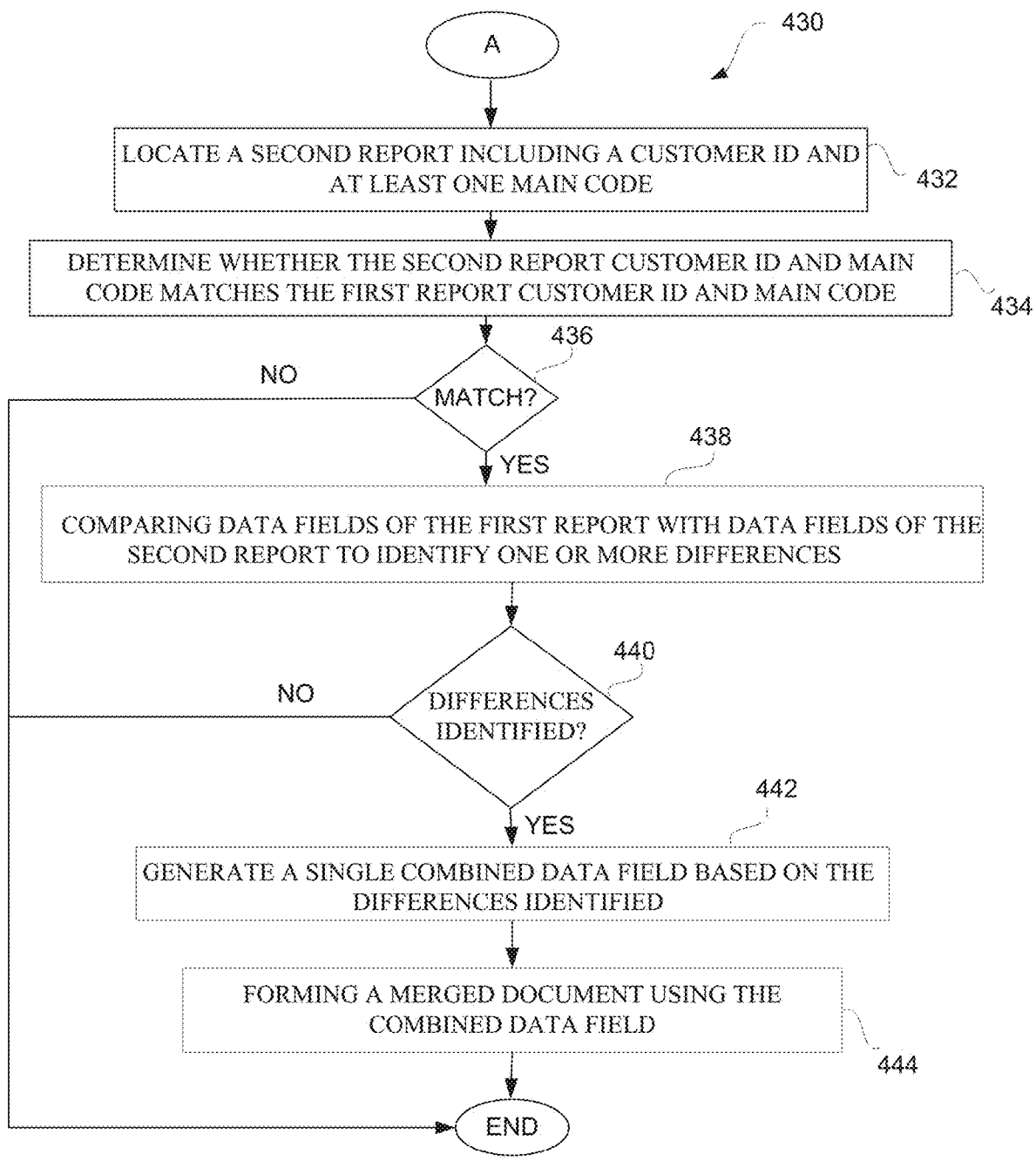

FIGS. 4A and 4B illustrate an exemplary method for locating and merging records. The method 400 provides that a first report may be received at 402. The report may have a plurality of data fields, including at least one descriptive term and a customer identification. Other data fields may also include associated codes and any other desired data fields. Customer identification may include information such as name, unique or user identification, phone number, address, password, electronic mail, or any other desired customer information. Item information may also include descriptive information of the item, location of where the item was lost or found, date the item was lost or found (e.g. a business name, room number, seat number, level, and/or additional location data of where the item was found), entry date of the report, and any other desired lost item information. Associated codes may be any codes associated with the report based upon keywords or terms obtained from the item information.

A determination if the at least one descriptive term matches at least one generic term is made at 404. If a match is found at 406, a generic code is associated with the at least one descriptive term at 408. The generic terms 128 may define what a product is. For example, under product term "SHOES", the generic terms may include sneakers, flip flop, high heel, crocks, boots and the like. In another example, product term "health beauty" may include the generic terms concealer, foundation, mineral, powder, and the like. As such, there may be substantially more generic terms than product terms, and substantially more product terms than main terms.

Each generic term 128 may be assigned a code or unique identifier. For example, "sneakers" may be assigned code 10-4B-C, "dress" may be assigned code 10-4B-GG, and the like. Although illustrated in numerical format, the code may be any unique code or identifier consisting of text, symbols, or numbers.

If no match is found at 406, a determination if the at least one descriptive term matches at least one product term at 410. If a match is found at 412, a product code is associated with the at least one descriptive term at 414. The product terms may be a higher-level term than the generic terms yet define what the products are. For example, the product terms may include pants, shirts, dress, shoes, and the like to describe the product "CLOTHING". In another example, product terms perfume, make-up, razor, soap, lipstick, and the like may describe "HEALTH BEAUTY". Each product term may be assigned a code or unique identifier. For example, "pants" may be assigned code 10-1, "shirt" may be assigned code 10-2, and the like. Although illustrated in numerical format, the code may be any unique code or identifier consisting of text, symbols, or numbers.

In one embodiment, each of the product terms and generic terms may also include alternative or misspelled keywords. For example, generic terms may include the following alternative or misspelled terms for "CROCS": "croks"; "crooks"; "krocks"; "kroks"; and any other misspelled terms. In another example, product term may include the following misspelled terms for "SNEAKERS": "sneeker";

"sneker"; "sneckr"; "snecker"; "sneaker"; and any other alternative or misspelled terms.

If no match is found at 412, a determination if the at least one descriptive term matches at least one main term is made at 416. If no match is found at 418, the method 400 may end. If a match is found at 418, a main code is associated with the at least one descriptive term at 420. The main terms may be main or high-level keyword terms to describe various products. The main terms may be a description used to describe a plurality of products. For example, main terms may include "clothing", "electronics", "sporting goods", and the like. Each main term may be assigned a code or unique identifier. For example, "clothing" may be assigned code 10. Although illustrated in numerical format, the code may be any unique code or identifier consisting of text, symbols, or numbers.

Since the main terms are high-level terms, there are less main terms than product terms and generic terms. Additionally, there are more generic terms than product terms since the generic terms are descriptive terms describing the product terms.

Referring now to FIG. 4B, the method 430 starts with locating a second report at 432. The second report, may have a plurality of data fields, including at least one descriptive term and a customer identification data field. Other data fields may also include associated codes and any other desired data fields. Customer identification may include information such as name, unique or user identification, phone number, address, password, electronic mail, or any other desired customer information. Item information may also include descriptive information of the item, location of where the item was lost or found, date the item was lost or found (e.g. a business name, room number, seat number, level, and/or additional location data of where the item was found), entry date of the report, and any other desired lost item information. Associated codes may be any codes associated with the report based upon keywords or terms obtained from the item information.

A determination whether the second report customer identification and main code matches the first report customer identification and main code at 434. Although described with matching the customer identification and main code data fields, this is not intended to be limiting as any data fields may be matched. For example, the customer identification and all the associated codes may be matched. If a match is found at 436, data fields of the first report with data field of the second report is compared to identify one or more differences at 438. If any differences are identified at 440, a single combined data field based on the differences identified may be generated at 442 to form a merged document using the combined data field at 444.

Although illustrated as merging two documents, this is not meant to be limiting as more than one document may be merged. For example, there may be two or more found item reports that may be merged with a single lost item report. In another embodiment, two or more lost item reports may be merged with a single found item report. Furthermore, although illustrated as merging a lost item report with a found item report, this is not intended to be limiting as two ore more lost item reports may be merged. In another embodiment, two or more found item reports may be merged. In still another embodiment, the found item report may be merged with the lost item report.

The resulting merged report or document may include information both from the first report and the second report. The merged or added information may be presented differently or separate from the information in the merged document. In one embodiment, the merged information may be presented as italics, bolded, in a different font, in a different text size, or presented in any other known different manner. In another embodiment, the merged information may be set apart from the information in the lost item report. For example, the added information may be presented and set apart in brackets, quotation marks, on another line, or set apart in any other known manner.

Figure 5:
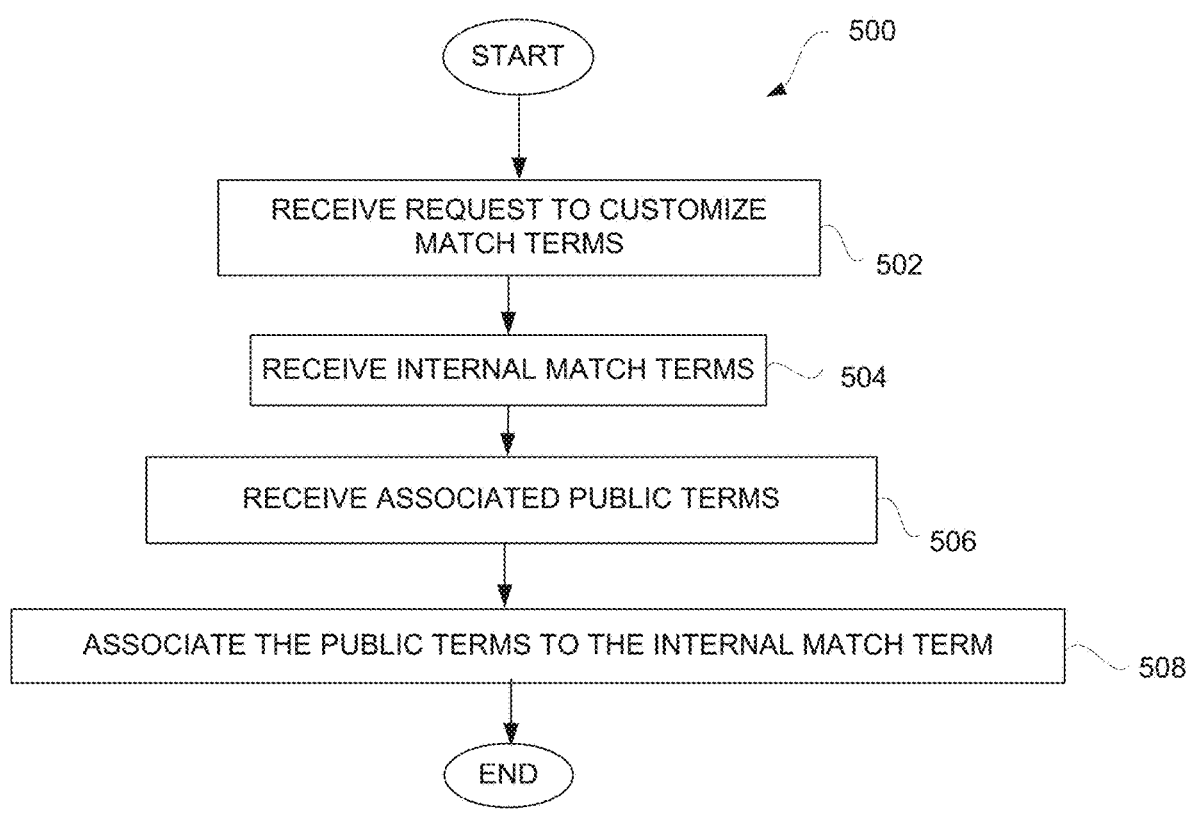
FIG. 5 illustrates an exemplary method for creating customized match terms.

FIG. 5 illustrates an exemplary method for creating customized match terms. The method 500 starts by receiving a request to customize match terms at 502. Recovery server (such as recovery server 108 illustrated in FIG. 1) may allow the establishment to further customize its own match terms stored in a database (such as establishment term database 118 illustrated in FIG. 1). Internal match terms may be received at 504. For example, if the establishment is a hotel, the hotel's main terms may be internal terms associated with a location within the hotel. For example, the internal term "ZONE-1-LOBBY" may be associated with the reception area of the lobby, internal term "ZONE-2-LOBBY" may be associated with the waiting are of the lobby, and internal term "POOL-NW" may be associated with the Jacuzzi area of the pool.

Associated public terms may be received at 506. Each internal term may have a plurality of generic public terms associated with each of the internal terms at 508. For example, "ZONE-1-LOBBY" may be associated with generic public terms "reception", "concierge", "front desk", "check-in", "receptionist", and the like. In another example, "POOL-NW" may be associated with generic public terms "Jacuzzi", "hot tub", "spa", "hot-tub", and the like.

In one embodiment, a recovery server may allow the establishment to add, edit, or delete any existing or pre-defined match terms (e.g. the main terms, product terms, or generic terms) to further customize the match terms to the establishment's desires. For example, the establishment may want to change or customize the pre-defined match term "CLOTHING" to "WOMEN CLOTHING" and "MEN CLOTHING". In other words, the establishment may customize any existing hierarchy of match terms stored in the match server databases.

Figure 6B:
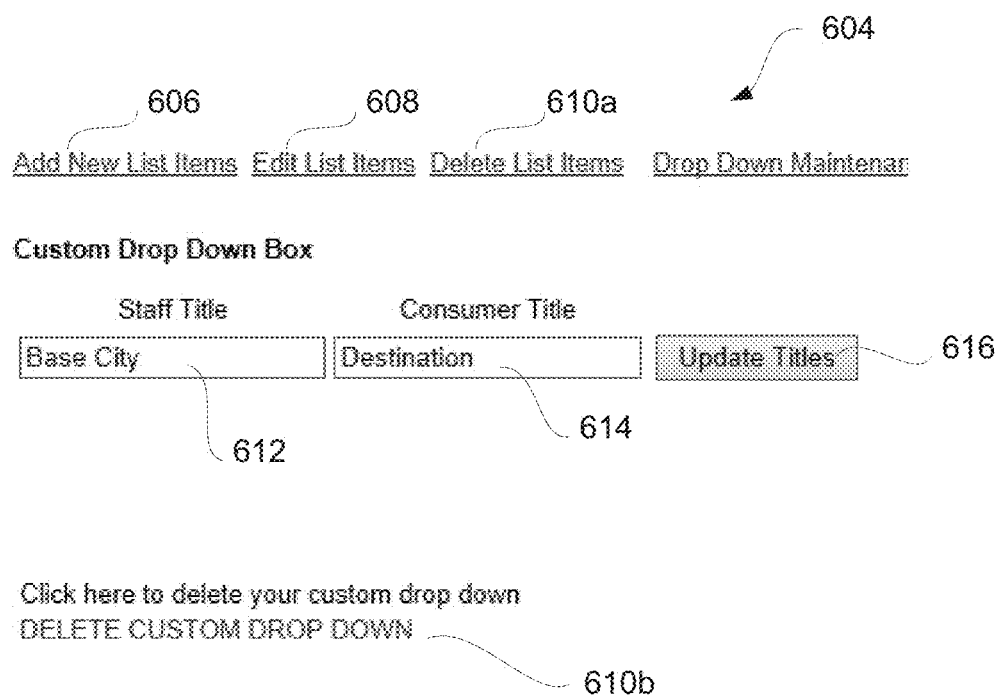

FIGS. 6A and 6B are exemplary screen shots illustrating customization of match terms. Referring to FIG. 6A, the screen shot 600 illustrates customization of match terms. The graphical user interface 600 allows an establishment (such as establishment server 104 illustrated in FIG. 1) to request customization of match terms at 602. Recovery server (such as recovery server 108 illustrated in FIG. 1) may allow the establishment to further customize its own match terms stored in a database (such as establishment term database 118 illustrated in FIG. 1).

Referring to FIG. 6B, the screen shot 604 illustrates customization of match terms. The graphical user interface 604 allows the establishment to add new word terms 606, edit existing or saved terms 608, or delete existing or saved terms 610a,b. To customize match terms, the establishment may enter an internal term at 612 as well as a public term at 614. For example, if the establishment is a hotel, the hotel's main terms may be internal terms associated with a location within the hotel. For example, the internal term "ZONE-1-LOBBY" may be associated with the reception area of the lobby, internal term "ZONE-2-LOBBY" may be associated with the waiting are of the lobby, and internal term "POOL-NW" may be associated with the Jacuzzi area of the pool.

The customized match terms may be received by the recovery server when "UPDATE TITLES" 616 or any other similar button is selected. Each internal term may have a plurality of generic public terms associated with each of the internal terms at 508. For example, "ZONE-1-LOBBY" may be associated with generic public terms "reception", "concierge", "front desk", "check-in", "receptionist", and the like. In another example, "POOL-NW" may be associated with generic public terms "Jacuzzi", "hot tub", "spa", "hot-tub", and the like.

In one embodiment, a recovery server may allow the establishment to add 606, edit 608, or delete 610a,b any existing or pre-defined match terms (e.g. the main terms, product terms, or generic terms) to further customize the match terms to the establishment's desires. For example, the establishment may want to change or customize the pre-defined match term "CLOTHING" to "WOMEN CLOTHING" and "MEN CLOTHING". In other words, the establishment may customize any existing hierarchy of match terms stored in the match server databases.

Figure 7:
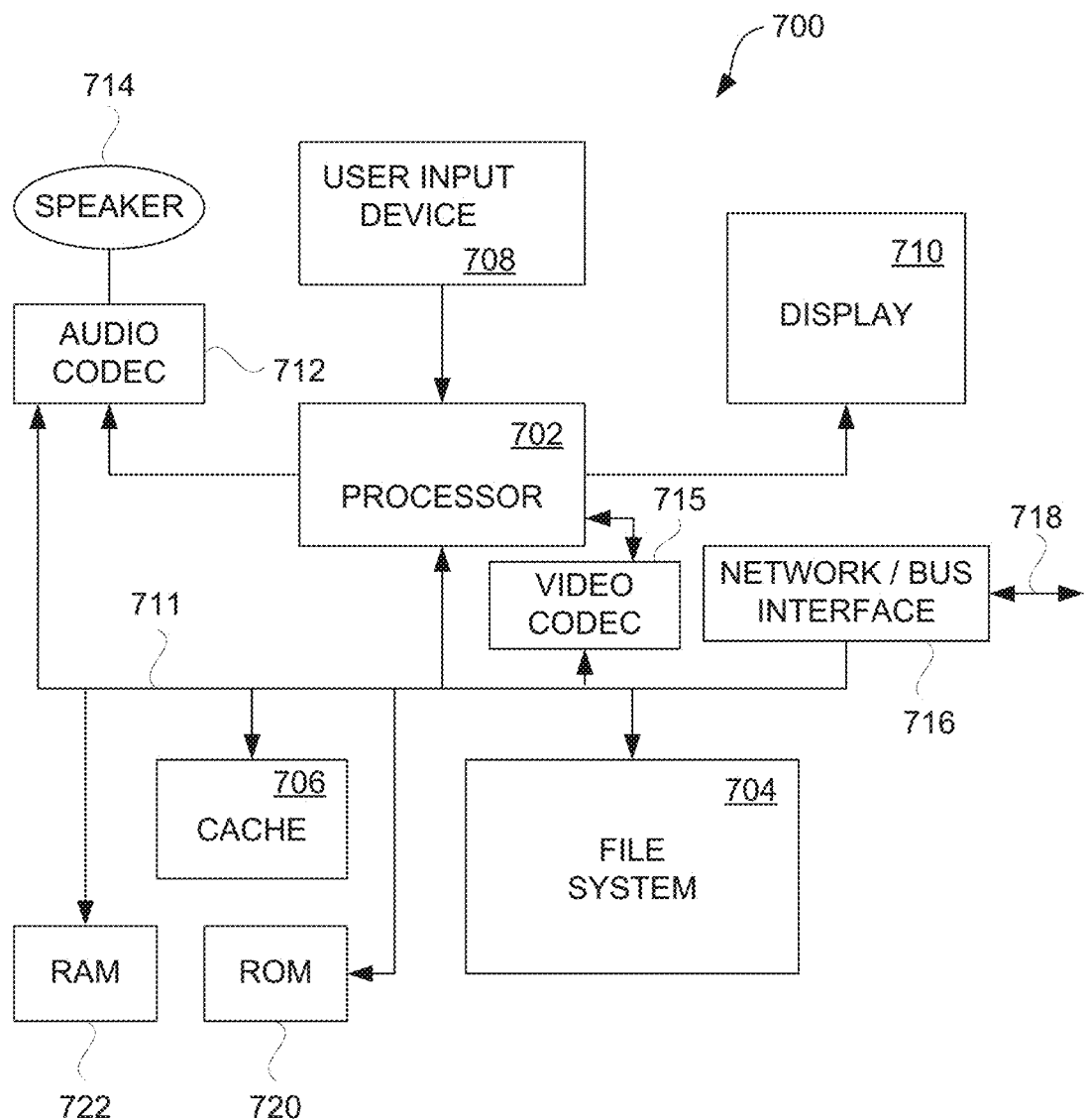
FIG. 7 illustrates a block diagram of a computing device according to one embodiment.

FIG. 7 illustrates a block diagram of a computing device 700 according to one embodiment. The computing device 700 can represent circuitry of a representative computing device (e.g. client device, recovery sever, shipping server, third party payment server, establishment server) described and illustrated in FIG. 1. The computing device can be designed to primarily stationary or can be portable.

The computing device 700 includes a processor 702 that pertains to a microprocessor or controller for controlling the overall operation of the computing device 700. The computing device 700 stores media data pertaining to media items in a file system 704 and a cache 706. The file system 704 is, typically, semiconductor memory (e.g., Flash memory) and/or one or more storage disks. The file system 704 typically provides high capacity storage capability for the computing device 700. However, since the access time to the file system 704 can be relatively slow, the computing device 700 can also include the cache 706. The cache 706 is, for example, Random-Access Memory (RAM). The relative access time to the cache 706 is typically shorter than for the file system 704. However, the cache 706 does not have the large storage capacity of the file system 704. The computing device 700 also includes a RAM 720 and a Read-Only Memory (ROM) 722. The ROM 722 can store programs, utilities or processes to be executed in a non-volatile manner. The RAM 720 provides volatile data storage, such as for the cache 706.

The computing device 700 may also include a user input device 708 that allows a user of the computing device 700 to interact with the computing device 700. For example, the user input device 708 can take a variety of forms, such as a button, keypad, dial, touch-sensitive surface, etc. Still further, the computing device 700 includes a display 710 (screen display) that can be controlled by the processor 702 to display information to the user. A data bus 711 can facilitate data transfer between at least the file system 704, the cache 706, the processor 702, an audio coder/decoder (CODEC) 712 and/or a video CODEC 715.

In one embodiment, for example, if the computing device 700 (e.g. client device 102a-n, establishment server 104 illustrated in FIG. 1) is a portable electronic device, the computing device 700 may store a plurality of data fields (e.g., customer information, product description, etc.) in the file system 704. When a user desires to report a lost item report the computing device may allow the user to input information in the data fields. The data fields may be displayed on the display 710. Then, using the user input device 708, a user can select one of the available data fields. The processor 702, upon receiving an input, stores the input into the data fields and, if necessary, out it to one or more appropriate output devices. If the particular media item is encrypted, the particular media item is first decrypted as noted above, which could involve one or more layers of encryption. As an example, for audio output, the processor 702 can supply the media data (e.g., audio file) for the particular media item to the audio CODEC 712. The audio CODEC 712 can then produce analog output signals for a speaker 714. The speaker 714 can be a speaker internal to the computing device 700 or external to the computing device 700. For example, headphones or earphones that connect to the computing device 700 would be considered an external speaker. As another example, for video output, the processor 702 can supply the media data (e.g., video file) for the particular media item to the video CODEC 715. The video CODEC 715 can then produce output signals for the display 710 and/or the speaker 714.

The computing device 700 also includes a network/bus interface 716 that couples to a data link 718. The data link 718 allows the computing device 700 to couple to another device (e.g., a host computer, a power source, or an accessory device). The data link 718 can be provided over a wired connection or a wireless connection. In the case of a wireless connection, the network/bus interface 716 can include a wireless transceiver.

The various aspects, features, embodiments or implementations of the invention described above can be used alone or in various combinations. Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment", "an embodiment", "one example" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

What is claimed is:

1. A computing system to generate a merged record, comprising:
    a client server configured to generate a first report having at least one internal term and at least one descriptive term; and
    a recovery server configured to:
        receive the first report;
        associate the at least one internal term with at least one of a plurality of public terms;
        associate the at least one descriptive term with a generic code or a product code; and
        associate the at least one descriptive term with at least one main code, the associated main code based upon the associated generic code or product code.

2. The computing system of claim 1, wherein to the associate the at least one descriptive term with a generic code or a product code, the recovery server is configured to:
    determine if the at least one descriptive term matches one of a plurality of generic terms stored in a terms database, each of the plurality of generic terms associated with the generic code;
    associate the generic code to the at least one descriptive term if it is determined that the at least one descriptive term matches one of the plurality of generic terms;
    determine if the at least one descriptive term matches one of a plurality of product terms if it is determined that the at least one descriptive term does not match one of the plurality of generic terms, each of the plurality of product terms associated with the product code; and
    associate the product code to the descriptive term if it is determined that the at least one descriptive term matches one of the plurality of product terms.

3. The computing system of claim 1, wherein the recovery server is configured to:
    locate a second report having second report information, the second report information including at least one public term and at least one main code; and
    determine whether the second report public term and main code matches the first report public term and main code.

4. The computing system of claim 3, wherein the recovery server is configured to:
    compare the first report information with the second report information to identify one or more differences, the first report information and the second report information having a plurality of data fields;
    determining if there are one or more differences between the at least one of the plurality of first report data fields and the at least one of the plurality of second report data fields;
    produce a single combined data field if the determining determines there are one or more differences; and
    generate a merged record using the combined data field.

5. The computing system of claim 4, wherein the single combined data field includes information from the first report data field and information from the second report data field, and
    wherein the information from the second report data field is presented differently or separate from the information from the first report data field.

6. The computing system of claim 5, wherein the information from the second report data field is presented in a different font or in a different color than the information from the first report data field.

7. The computing system of claim 1, wherein the at least one internal term and the at least one public term describes a particular location within an establishment.

8. A method for generating a merged report, comprising:
    receiving, at a server, a first report, the first report including first report information, the first report information including at least one descriptive term and at least one internal term;
    associating the at least one descriptive term with a generic code or a product code; and
    associating the at least one descriptive term with at least one main code, the associated main code based upon the associated generic code or product code.

9. The method of claim 8, wherein the associating the at least one descriptive term with a generic code or a product code, comprises:
    determining if the at least one descriptive term matches one of a plurality of generic terms stored in a terms database, each of the plurality of generic terms associated with the generic code;
    associating the generic code to the at least one descriptive term if it is determined that the at least one descriptive term matches one of the plurality of generic terms;
    determining if the at least one descriptive term matches one of a plurality of product terms if it is determined that the at least one descriptive term does not match one of the plurality of generic terms, each of the plurality of product terms associated with the product code; and
    associating the product code to the descriptive term if it is determined that the at least one descriptive term matches one of the plurality of product terms.

10. The method of claim 8, wherein the internal term describes a particular location within an establishment.

11. The method of claim 8, wherein the first report information includes at least one internal term, and wherein the method comprises:
    associating the at least one internal term with at least one of a plurality of public terms;
    locating a second report having second report information, the second report information including at least one public term and at least one main code; and
    determining whether the second report public term and main code matches the first report public term and main code.

12. The method of claim 11, comprising:
    comparing the first report information with the second report information to identify one or more differences, the first report information and the second report information having a plurality of data fields;
    determining if there are one or more differences between the at least one of the plurality of first report data fields and the at least one of the plurality of second report data fields;
    generating a single combined data field if the determining determines there are one or more differences; and
    forming a merged report using the combined data field.

13. The method of claim 12, wherein the single combined data field includes information from the first report data field and information from the second report data field, and
    wherein the information from the second report data field is presented differently or separate from the information from the first report data field.

14. The method of claim 11, wherein the information from the second report data field is presented in a different font or color than the information from the first report data field.

15. A method for generating a merged lost report, comprising:

receiving, at a server, a lost report, the lost report including lost report information, the lost report information including at least one descriptive term and an internal term;

associating the at least one internal term with at least one of a plurality of public terms;

associating the at least one descriptive term with a generic code or a product code;

associating the at least one descriptive term with at least one main code, the associated main code based upon the associated generic code or product code;

locating a found report having found report information, the found report information including at least a public term and at least one main code; and determining whether the found report public term and main code matches the first report public term and main code.

16. The method of claim 15, wherein the associating the at least one descriptive term with a generic code or a product code, comprises:

determining if the at least one descriptive term matches one of a plurality of generic terms stored in a terms database, each of the plurality of generic terms associated with the generic code;

associating the generic code to the at least one descriptive term if it is determined that the at least one descriptive term matches one of the plurality of generic terms;

determining if the at least one descriptive term matches one of a plurality of product terms if it is determined that the at least one descriptive term does not match one of the plurality of generic terms, each of the plurality of product terms associated with the product code; and associating the product code to the descriptive term if it is determined that the at least one descriptive term matches one of the plurality of product terms.

17. The method of claim 16, further comprising:

comparing the first report information with the found report information to identify one or more differences, the first report information and the found report information having a plurality of data fields;

determining if there are one or more differences between the at least one of the plurality of first report data fields and the at least one of the plurality of found report data fields;

generating a single combined data field if the determining determines there are one or more differences; and forming a merged report using the combined data field.

18. The method of claim 15, wherein the internal code describes a particular location within an establishment.

19. The method of claim 18, wherein the single combined data field includes information from the first report data field and information from the found report data field, and wherein the information from the found report data field is presented differently or separate from the information from the first report data field.

20. A program storage device readable by a machine tangibly embodying a program of instructions executable by the machine to perform a method for generating a merged record for a lost item, the method comprising:

receiving a first report, the first report including first report information, the first report information including at least one descriptive term;

associating the at least one descriptive term of the first report with a generic code or a product code;

associating the generic code or the product code for the first report with at least one main code;

receiving a second report, the second report including second report information, the second report information including at least one descriptive term;

associating the at least one descriptive term of the second report with a generic code or a product code;

associating the generic code or product code for the second report with at least one main code;

comparing the first report information and one or more of the associated generic, product or main codes therefor with the second report information and one or more of the associated generic, product or main codes therefor;

determining whether the first report and the second report should be merged based on the comparing; and producing a merged record for the lost item based on the comparing.

* * * * *